(12) United States Patent
Mok et al.

(10) Patent No.: US 8,989,222 B1
(45) Date of Patent: Mar. 24, 2015

(54) JUSTIFICATION INSERTION AND REMOVAL IN GENERIC MAPPING PROCEDURE IN AN OPTICAL TRANSPORT NETWORK

(71) Applicant: PMC-Sierra US, Inc., Sunnyvale, CA (US)

(72) Inventors: Winston Ki-Cheong Mok, Vancouver (CA); Somu Karuppan Chetty, Vancouver (CA); Jonathan Avey, Vancouver (CA); Steven Scott Gorshe, Beaverton, OR (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 195 days.

(21) Appl. No.: 13/836,100

(22) Filed: Mar. 15, 2013

Related U.S. Application Data

(60) Provisional application No. 61/704,259, filed on Sep. 21, 2012.

(51) Int. Cl.
*H04J 3/16* (2006.01)
*H04J 14/02* (2006.01)

(52) U.S. Cl.
CPC ........... *H04J 14/0201* (2013.01); *H04J 3/1652* (2013.01)
USPC ............ 370/505; 370/503; 370/476; 370/474

(58) Field of Classification Search
CPC .............................. H04J 3/1652; H04J 3/1658
USPC ............... 370/505, 503, 474, 535; 398/58, 52
See application file for complete search history.

(56) References Cited

U.S. PATENT DOCUMENTS

| 7,606,297 | B2 * | 10/2009 | Waschura et al. | 375/224 |
|---|---|---|---|---|
| 7,782,843 | B2 | 8/2010 | Zou et al. | |
| 8,135,285 | B2 * | 3/2012 | Kisaka et al. | 398/182 |
| 8,170,421 | B2 | 5/2012 | Li | |
| 8,204,382 | B2 * | 6/2012 | Gazier et al. | 398/115 |
| 8,638,683 | B2 | 1/2014 | Honma et al. | |
| 8,731,398 | B2 | 5/2014 | Akiyama et al. | |
| 8,774,640 | B2 | 7/2014 | Xiao et al. | |
| 8,861,582 | B2 * | 10/2014 | Shibasaki | 375/233 |
| 2002/0027929 | A1 * | 3/2002 | Eaves | 370/505 |
| 2007/0071443 | A1 * | 3/2007 | Fukumitsu et al. | 398/79 |
| 2007/0076769 | A1 * | 4/2007 | Zou | 370/539 |

(Continued)

OTHER PUBLICATIONS

USPTO Office Action for U.S. Appl. No. 13/835,443 dated Sep. 19, 2014, 13 pages.

(Continued)

*Primary Examiner* — Rasheed Gidado
(74) *Attorney, Agent, or Firm* — Dennis R. Haszko

(57) ABSTRACT

A method and apparatus are provided for generating Generic Mapping Procedure (GMP) stuff/data decisions, which avoids brute force modulo arithmetic and is efficient for hitless adjustment of ODUFlex (G.7044) in an Optical Transport Network (OTN). Addition operations are used, rather than multiplication operations, to facilitate faster and less computationally expensive calculation of data/stuff decisions, based on calculated residue values. Residue values are logically arranged in rows to facilitate residue calculation, such as based on relationships with previously calculated residue values. This method is also applicable for mapping and de-mapping Constant Bit Rate (CBR) clients into and from an ODUk carrier.

31 Claims, 18 Drawing Sheets

(56) References Cited

U.S. PATENT DOCUMENTS

| | | |
|---|---|---|
| 2010/0014857 A1* | 1/2010 | Haas .............................. 398/43 |
| 2011/0170864 A1 | 7/2011 | Tani et al. |
| 2012/0002965 A1 | 1/2012 | Bellato et al. |
| 2012/0014270 A1 | 1/2012 | Honma et al. |
| 2012/0170936 A1 | 7/2012 | Vissers et al. |
| 2013/0004169 A1 | 1/2013 | Mohamad et al. |
| 2013/0315592 A1 | 11/2013 | Sharma et al. |

OTHER PUBLICATIONS

International Telecommunications Union, "Characteristics of optical transport network hierarchy equipment functional blocks," ITU-T Recommendation G.798, Telecommunication Standardization Sector of ITU, 397 pages, Dec. 2012.

International Telecommunications Union, "Interfaces for the Optical Transport Network (OTN)," ITU-T Recommendation G.709/Y.1331, Telecommunication Standardization Sector of ITU, 232 pages, Feb. 2012.

International Telecommunications Union, "Hitless Adjustment of ODUflex (GFP) (HAO)," ITU-T Recommendation G.7044/Y1347, Telecommunication Standardization Sector of ITU, 32 pages, Oct. 2011.

International Telecommunications Union, "Transport of IEEE 10GBASE-R in optical transport networks (OTN)," Supplement 43 to ITU-T G-series Recommendation, Telecommunication Standardization Sector of ITU, 27 pages, Feb. 2011.

* cited by examiner

| MFAS (678) | MF Row | Frame Row | 1 | ............ | 15 | 16 | PL Row 17 / 1 |
|---|---|---|---|---|---|---|---|
| "000" | 1 | 1 | | | TSOH A | TS1 A 1.25G | A1 |
| | 2 | 2 | | | | | A476 |
| | 3 | 3 | | | | | A951 |
| | 4 | 4 | | | | | A1426 |
| "001" | 5 | 1 | | | TSOH B | TS2 B 1.25G | A1901 |
| | 6 | 2 | | | | | A2376 |
| | 7 | 3 | | | | | A2851 |
| | 8 | 4 | | | | | A3326 |
| "010" | 9 | 1 | | | TSOH | TS2 C 1.25G | A3801 |
| | 10 | 2 | | | | | A4276 |
| | 11 | 3 | | | | | A4751 |
| | 12 | 4 | | | | | A5226 |
| "011" | 13 | 1 | | | TSOH | TS4 C 1.25G | A5701 |
| | 14 | 2 | | | | | A6176 |
| | 15 | 3 | | | | | A6651 |
| | 16 | 4 | | | | | A7126 |
| "100" | 17 | 1 | | | TSOH B | TS5 B 1.25G | A7601 |
| | 18 | 2 | | | | | A8076 |
| | 19 | 3 | | | | | A8551 |
| | 20 | 4 | | | | | A9026 |
| "101" | 21 | 1 | | | TSOH | TS2 C 1.25G | A9501 |
| | 22 | 2 | | | | | A9976 |
| | 23 | 3 | | | | | A10451 |
| | 24 | 4 | | | | | A10926 |
| "110" | 25 | 1 | | | TSOH | TS7 C 1.25G | A11401 |
| | 26 | 2 | | | | | A11876 |
| | 27 | 3 | | | | | A12351 |
| | 28 | 4 | | | | | A12826 |
| "111" | 29 | 1 | | | TSOH C | TS8 C 1.25G | A13301 |
| | 30 | 2 | | | | | A13776 |
| | 31 | 3 | | | | | A14251 |
| | 32 | 4 | | | | | A14726 |

FIG. 4A

| 2 | 3 | 4 | 5 | 6 | 7 | 8 | |
|---|---|---|---|---|---|---|---|
| 18 | 19 | 20 | 21 | 22 | 23 | 24 | ............... |
| B1 | C1 | C2 | B2 | C3 | C4 | C5 | |
| B953 | C2381 | C2382 | B954 | C2383 | C2384 | C2385 | |
| B1905 | C4761 | C4762 | B1906 | C4763 | C4764 | C4765 | ............... |
| B2857 | C7141 | C7142 | B2858 | C7143 | C7144 | C7145 | |
| B3809 | C9521 | C9522 | B3810 | C9523 | C9524 | C9525 | |
| B4761 | C11901 | C11902 | B4762 | C11903 | C11904 | C11905 | |
| B5713 | C14281 | C14282 | B5714 | C14283 | C14284 | C14285 | ............... |
| B6665 | C16661 | C16662 | B6666 | C16663 | C16664 | C16665 | |
| B7617 | C19041 | C19042 | B7618 | C19043 | C19044 | C19045 | |
| B8569 | C21421 | C21422 | B8570 | C21423 | C21424 | C21425 | |
| B9521 | C23801 | C23802 | B9522 | C23803 | C23804 | C23805 | ............... |
| B10473 | C26181 | C26182 | B10474 | C26183 | C26184 | C26185 | |
| B11425 | C28561 | C28562 | B11426 | C28563 | C28564 | C28565 | |
| B12377 | C30941 | C30942 | B12378 | C30943 | C30944 | C30945 | |
| B13329 | C33321 | C33322 | B13330 | C33323 | C33324 | C33325 | ............... |
| B14281 | C35701 | C35702 | B14282 | C35703 | C35704 | C35705 | |
| B15233 | C38081 | C38082 | B15234 | C38083 | C38084 | C38085 | |
| B16185 | C40461 | C40462 | B16186 | C40463 | C40464 | C40465 | |
| B17137 | C42841 | C42842 | B17138 | C42843 | C42844 | C42845 | ............... |
| B18089 | C45221 | C45222 | B18090 | C45223 | C45224 | C45225 | |
| B19041 | C47601 | C47602 | B19042 | C47603 | C47604 | C47605 | |
| B19993 | C49981 | C49982 | B19994 | C49983 | C49984 | C49985 | |
| B20945 | C52361 | C52362 | B20946 | C52363 | C52364 | C52365 | ............... |
| B21897 | C54741 | C54742 | B21898 | C54743 | C54744 | C54745 | |
| B22849 | C57121 | C57122 | B22850 | C57123 | C57124 | C57125 | |
| B23801 | C59501 | C59502 | B23802 | C59503 | C59504 | C59505 | |
| B24753 | C61881 | C61882 | B24754 | C61883 | C61884 | C61885 | ............... |
| B25705 | C64261 | C64262 | B25706 | C64263 | C64264 | C64265 | |
| B26657 | C66641 | C66642 | B26658 | C66643 | C66644 | C66645 | |
| B27609 | C69021 | C69022 | B27610 | C69023 | C69024 | C69025 | |
| B28561 | C71401 | C71402 | B28562 | C71403 | C71404 | C71405 | ............... |
| B29513 | C73781 | C73782 | B29514 | C73783 | C73784 | C73785 | |

FIG. 4B

|   | 1 | 2 | 3 | 4 | 5 | 6 | 7 | 8 |   |
|---|---|---|---|---|---|---|---|---|---|
|   | A1(1) | A2(1) | A3(1) | A4(1) | A5(1) | A6(1) | A7(1) | A8(1) | ........ |
|   | A477(1) | A478(1) | A479(1) | A480(1) | A481(1) | A482(1) | A483(1) | A484(1) | ........ |
|   | A953(1) | A954(1) | A955(1) | A956(1) | A957(1) | A958(1) | A959(1) | A960(1) | ........ |
|   | A1429(1) | A1430(1) | A1431(1) | A1432(1) | A1433(1) | A1434(1) | A1435(1) | A1436(1) |   |
|   |   |   |   | ........ |   |   |   |   |   |
|   | A13329(1) | A13330(1) | A13331(1) | A13332(1) | A13333(1) | A13334(1) | A13335(1) | A13336(1) |   |
|   | A13805(1) | A13806(1) | A13807(1) | A13808(1) | A13809(1) | A13810(1) | A13811(1) | A13812(1) |   |
|   | A14281(1) | A14282(1) | A14283(1) | A14284(1) | A14285(1) | A14286(1) | A14287(1) | A14288(1) |   |
|   | A14757(1) | A14758(1) | A14759(1) | A14760(1) | A14761(1) | A14762(1) | A14763(1) | A14764(1) |   |

FIG. 5

| | 1 | 2 | 3 | 4 | 5 | 6 | 7 | 8 | |
|---|---|---|---|---|---|---|---|---|---|
| | B1(1) | B1(2) | B2(1) | B2(2) | B3(1) | B3(2) | B4(1) | B4(2) | ⋯ |
| | B477(1) | B477(2) | B478(1) | B478(2) | B479(1) | B479(2) | B480(1) | B480(2) | |
| | B953(1) | B953(2) | B954(1) | B954(2) | B955(1) | B955(2) | B956(1) | B956(2) | ⋯ |
| | B1429(1) | B1429(2) | B1430(1) | B1430(2) | B1431(1) | B1431(2) | B1432(1) | B1432(2) | |
| | ⋮ | | | | | | | | |
| | B13329(1) | B13329(2) | B13330(1) | B13330(2) | B13331(1) | B13331(2) | B13332(1) | B13332(2) | |
| | B13805(1) | B13805(2) | B13806(1) | B13806(2) | B13807(1) | B13807(2) | B13808(1) | B13808(2) | ⋯ |
| | B14281(1) | B14281(2) | B14282(1) | B14282(2) | B14283(1) | B14283(2) | B14284(1) | B14284(2) | |
| | B14757(1) | B14757(2) | B14758(1) | B14758(2) | B14759(1) | B14759(2) | B14760(1) | B14760(2) | |

FIG. 6

| | 1 | 2 | 3 | 4 | 5 | 6 | 7 | 8 | |
|---|---|---|---|---|---|---|---|---|---|
| | C1(1) | C1(2) | C1(3) | C1(4) | C1(5) | C2(1) | C2(2) | C2(3) | ......... |
| | C477(1) | C477(2) | C477(3) | C477(4) | C477(5) | C478(1) | C478(2) | C478(3) | ......... |
| | C953(1) | C953(2) | C953(3) | C953(4) | C953(5) | C954(1) | C954(2) | C954(3) | ......... |
| | C1429(1) | C1429(2) | C1429(3) | C1429(4) | C1429(5) | C1430(1) | C1430(2) | C1430(3) | ......... |
| | | | | ......... | | | | | |
| | C13329(1) | C13329(2) | C13329(3) | C13329(4) | C13329(5) | C13330(1) | C13330(2) | C13330(3) | |
| | C13805(1) | C13805(2) | C13805(3) | C13805(4) | C13805(5) | C13806(1) | C13806(2) | C13806(3) | |
| | C14281(1) | C14281(2) | C14281(3) | C14281(4) | C14281(5) | C14282(1) | C14282(2) | C14282(3) | |
| | C14757(1) | C14757(2) | C14757(3) | C14757(4) | C14757(5) | C14758(1) | C14758(2) | C14758(3) | |

FIG. 7

JUSTIFICATION INSERTION AND REMOVAL IN GENERIC MAPPING PROCEDURE IN AN OPTICAL TRANSPORT NETWORK

CROSS REFERENCE TO RELATED APPLICATIONS

This application claims the benefit of priority of U.S. Provisional Patent Application No. 61/704,259 filed Sep. 21, 2012, which is incorporated herein by reference in its entirety.

FIELD

The present disclosure relates generally to optical data communications. More particularly, the present disclosure relates to justification and removal, such as in the generic mapping procedure used in multiplexing and demultiplexing in an optical transport network.

BACKGROUND

Bandwidth demand on telecommunications networks is increasing dramatically. In response, the International Telecommunications Union (ITU) has standardized the Optical Transport Network (OTN), which is a dense wavelength division multiplexing (DWDM) network. The rates and formats of OTN constructs such as optical channel transport unit (OTU)k and optical channel data unit (ODU)k are defined in ITU-T G.709.

ITU-T G.709 has a defined number of ODUk frames; k=0, 1, 2, 2e, 3 and 4, in order of increasing rates. A lower rate ODUj can be multiplexed into a higher rate ODUk. Multi-level multiplexing is allowed. For example, eight ODU0 streams may be multiplexed into an ODU2, which may, in turn, be multiplexed along with nine other ODU2 streams, into an ODU4. FIGS. 1A and 1B show an OTN terminating device that supports two level of multiplexing.

The multiplexing of Low Order (LO) ODUj/ODUflex clients into a High Order (HO) ODUk carrier is performed in two logical steps, Rate Justification and Multiplexing. Rate Justification encodes the rate of each LO ODUj in relation to an optical channel data tributary unit (ODTU) using either AMP (Asynchronous Mapping Procedure) or GMP (Generic Mapping Procedure) as defined in ITU-T G.709. The ODTU streams are phase locked to HO ODUk carrier. Then, the resultant ODTUs are multiplexed into the HO Server Multi-frame of the HO OPUk. An example of multiplexing an ODU0, an ODU1 and an ODUflex occupying five TribSlots is shown in FIG. 2.

The de-multiplexing of LO ODUj/ODUflex clients from a HO ODUk carrier is also performed in two logical steps, De-multiplexing and Rate Justification. The De-multiplexing step extracts a set of ODTU streams, one for each LO ODUj, from the HO ODUk. The ODTU streams are phase locked to the HO ODUk carrier. The Rate Justification step recovers the rate of each LO ODUj in relation to its ODTU by decoding the AMP or GMP Justification Controls, as defined in ITU-T G.709. An example of de-multiplexing an ODU0, an ODU1 and an ODUflex occupying five TribSlots from a High-Order ODU2 is shown in FIG. 3.

The individual LO channels are not frame aligned with the HO channel frame. Each LO channel is mapped in an ODTU which is a rate justified structure that fills the Tributary Slots allotted to the LO channel within the HO ODUk. The first byte of each LO ODTU is aligned with the HO ODUk Tributary Multi-frame. Bytes of an ODTU are grouped into M-byte words, where M is the number of TribSlots allocated to the ODTU. For identifying Data vs Stuff words in GMP, words are numbered using an index j. The first word is given j=1.

With current technologies, for a device that is capable of processing a 100 Gbps datastream, the internal parallel data-bus width (W) is expected to range from 32 to 64 bytes. W is expected to grow for 400 Gbps and 1 Tbps bandwidth devices of the future. The number of Tributary Slots (M) allocated to a LO ODUk in the HO carrier varies. Example values of M are as follows: ODU1: M=2; ODU2: M=8; ODU3: M=32; ODU4: M=80; and ODUflex: M=Variable.

FIGS. 4A and 4B show an ODU2 multi-frame with three LO channels, an ODU0, ODU1 and ODUflex5. The Tributary Slots in the HO are split into a repeating sequence of LO TS allocated based on rate. ODU0=1 TS (Channel A), ODU1=2 TS (Channel B), and ODUflex5=5 TS (Channel C). The label within each byte shows the client channel, the GMP word index (j), and the byte count within the GMP word, inside parenthesis.

When De-multiplexing, the ODU overhead is removed and the resultant OPU (columns 17-3824) are demultiplexed into the Optical Data Transport Units (ODTU). An ODTU2.1 is shown in FIG. 5 (channel A), ODTU12 in FIG. 6 (channel B) and ODTU2.5 in FIG. 7 (channel C).

LO clients can be added or removed from a HO carrier without affecting any other LO clients. In addition, in ITU-T G.7044, a LO ODUflex Generic Framing Procedure (GFP) channel can be hitlessly resized without affecting any other LO clients.

GMP is a generic mapping procedure defined in ITU-T G.709. GMP is used to match the rate of the LO ODUj to the ODTU payload area. The ODTU bytes are then mapped into the OPUk Tributary Slots. Justification Control bytes in the GMP overhead specify the number of M-byte words in each ODTU frame that carry LO ODUj bytes (known as Data Words). The remaining words in the ODTU frame are filled with Stuff Words. The distribution of Data and Stuff words are given by Equations 1 and 2 below.

In Equation 1 and Equation 2, Cm is the number of client Data Words mapped into the payload area of the Server allocated to that client. Each M-byte word is indexed by j, where j=1 to $P_{m,server}$ M-byte words. $P_{m,server}$ is the number of words in the ODTU frame. A word is a client Data Word when Equation 1 is satisfied, and is a Stuff Word when Equation 2 is satisfied. An example of how Data and Stuff words may be distributed in an ODTU frame is shown in FIG. 8.

$$\text{client data } (D)\text{: if}(j \times C_m) \bmod P_{m,server} < C_m \qquad \text{Equation 1}$$

$$\text{stuff } (S)\text{: if}(j \times C_m) \bmod P_{m,server} \geq C_m. \qquad \text{Equation 2}$$

A known implementation of a multiplexer follows the G.709 definitions directly and is shown in FIGS. 9A and 9B. A set of LO ODU clients are delivered over a W-byte datapath in a TDM (time division multiplex) fashion. The incoming data of each LO ODUj is stored in separate FIFOs. Each of the LO ODU clients is multiplexed into a HO ODUk carrier of M Tributary Slots. Each LO ODU client is allocated M of the T Tributary Slots in the HO Server multi-frame (MF), based on its nominal rate. The LO channel data is rate justified using the Generic Mapping Procedure (GMP). The number and position of the justification stuff bytes is calculated with a channelized Time Division Multiplexing GMP engine. The resultant number of data bytes needed and justification pattern is used by the Expander block to expand the data by inserting stuff bytes. The justified data, with width of W bytes, is stored in a separate justified FIFO per LO channel.

At the HO Server side, the TDM databus may carry words from multiple HO ODUk carriers. Each W-byte word contains a certain number of bytes from a set of LO ODU client bytes associated with that HO ODUk carrier. The bytes required are read from the corresponding LO justified FIFOs and then inserted into the correct byte locations of the HO carrier word using the W:1 multiplexers. This implementation is very gate intensive as most elements are replicated by the number of potential LO ODU clients. For example, an ODU4 or a set of ten ODU2s can consist of up to 80 LO ODU0 clients.

A known implementation of a de-multiplexer follows the G.709 definitions directly and is shown in FIG. 10. A set of HO ODUk carriers are delivered over a W-byte datapath (in a TDM (time division multiplex) fashion. The incoming data is broadcast to a set of N De-multiplex blocks, one for each potential LO ODU client. For example, a HO ODU4 or a set of ten HO ODU2s may consist of up to 80 LO ODU0 clients. Each De-Multiplex block extracts bytes in the HO ODUk words that belong to the associated LO ODU client, and assembles them into W-byte words. The words are stored in separate ODTU FIFOs, one for each LO ODU client. The LO ODU client words contain both Data and Stuff bytes. A scheduler reads from each ODTU FIFO at a rate proportional to the number of Tributary Slots assigned to the LO ODU client. The words reads from the ODTU FIFO are passed to the GMP processor to identify Data and Stuff bytes. A typical implementation of the GMP block is to first identify the GMP offset (j) of each byte and from that determine if it is a client data (D) or stuff (S) using Equation 1 and Equation 2. For a datapath width of W bytes, up to W decisions are required per clock cycle. The Compactor block removes the Stuff bytes and constructs W-byte words of client data bytes.

As lines rates go up, the container sizes increase but the granularity remains the same. The systems now have ODU4 carriers with 80 Tributary Slots and ODUFlex containers which occupy a variable number of Tributary Slots. The Generic Mapping Procedure implementation must accommodate many different rates, over multiple clients, running in Time Division Multiplexed channels.

The implementation must also be flexible to add or remove channels, and do ODUflex hitless resizing. This requires that the justification patterns to be changed on the fly and coordinated between the justification and multiplexing stages. The data that is in FIFOs cannot be corrupted between justification contexts, and more importantly information pertaining to the context must pass through FIFOs.

It is, therefore, desirable to provide an improved approach to justification insertion/removal.

BRIEF DESCRIPTION OF THE DRAWINGS

Embodiments of the present disclosure will now be described, by way of example only, with reference to the attached Figures.

FIGS. 4A and 4B illustrate an example of TribSlot Assignment of LO ODUj clients in an ODU2.

FIG. 5 illustrates an example of ODTU2.1.

FIG. 6 illustrates an example of ODTU12.

FIG. 7 illustrates an example of ODTU2.5.

DETAILED DESCRIPTION

Figure 1A:
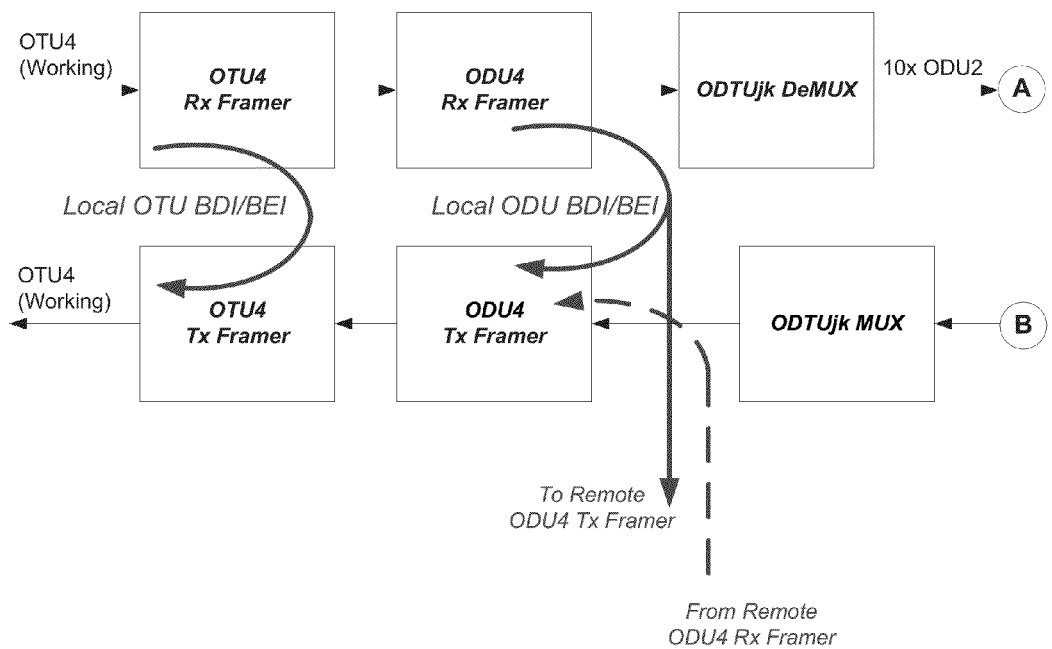
FIGS. 1A and 1B illustrate a typical OTN device with two levels of multiplexing.
Figure 1B:
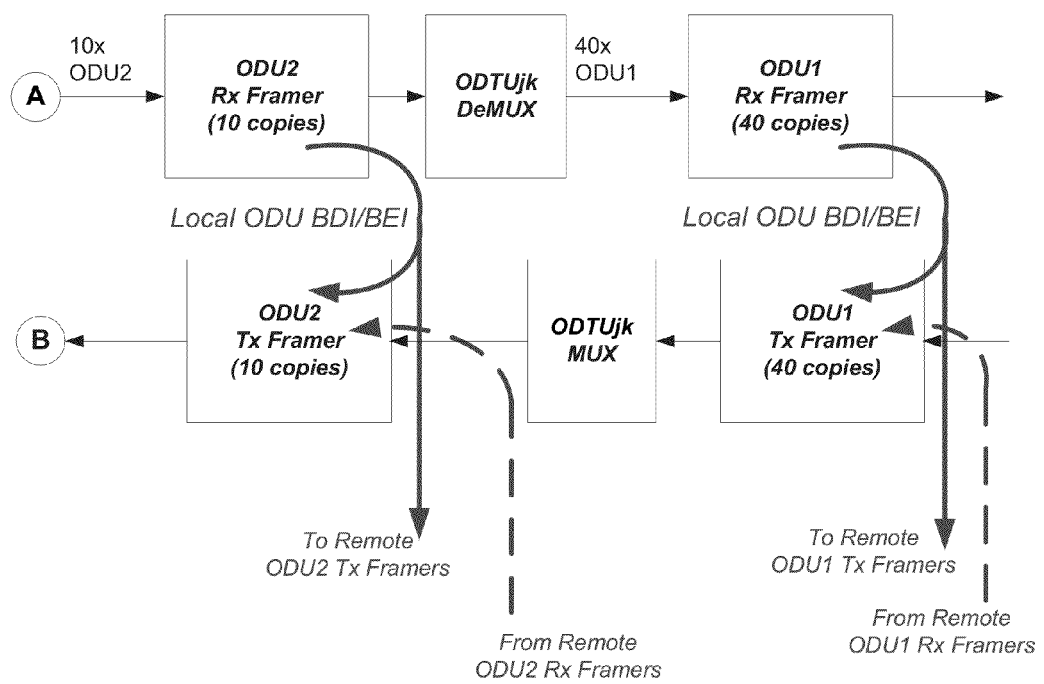

Generally, the present disclosure provides a method and an apparatus for generating Generic Mapping Procedure (GMP) stuff/data decisions, which avoids brute force modulo arithmetic and is efficient for hitless adjustment of ODUFlex (G.7044) in an Optical Transport Network (OTN). Addition operations are used, rather than multiplication operations, to facilitate faster and less computationally expensive calculation of data/stuff decisions, based on calculated residue values. Residue values are logically arranged in rows to facilitate residue calculation, such as based on relationships with previously calculated residue values. This method is also applicable for mapping and de-mapping Constant Bit Rate (CBR) clients into and from an ODUk carrier.

In an embodiment, the present disclosure provides a method of identifying M-byte wide data/stuff bytes in a mapping operation or multiplexing operation in an Optical Transport Network (OTN) comprising: organizing residues of a plurality of data/stuff decisions in rows of W residues, in order of incrementing index; generating a first row of residues and corresponding flags sequentially in order of index using an incremental method based on a first addition operation and recording the last residue of the first row; generating a subset of residues and corresponding flags in subsequent rows using a stride method based on a second addition operation; generating remaining residues and corresponding flags in subsequent rows using the incremental method based on residues derived from the stride method as starting point; deriving a word-level stuff/data decision from each residue; and expanding each word-level data/stuff decision to cover all bytes within an M byte word.

In an example embodiment, the first addition operation of the incremental method comprises adding to Residue(j) a first increment value derived from the number of client words mapped into a payload area of a server allocated to a client and a flag associated with Residue(j), to generate Residue(j+1) and its associated flag, in the absence of a multiply or mod operation involving a non-power of two divisor.

In an example embodiment, the rows each comprise a plurality of cells, and the second addition operation in the stride method comprises adding to the Residue(k) of a cell in row N, a second incremental value derived from the Residue (W) of the last cell in Row 1 and a flag associated with Residue(k), to generate Residue(k+W) and its associated flag, in the absence of a multiply or mod operation involving a non-power of two divisor.

In an example embodiment, expanding each word-level decision comprises: selecting each word-level data/stuff decision to generate M data/stuff decisions and create a set of byte-level data/stuff decisions; selecting a first W length row as the byte-level stuff/data decisions; shifting an original row of word-level data/stuff decisions and offsetting a window for choosing a W length byte-level data/stuff in order to select a next W length byte-level data/stuff from the rows; and using a next word-level row after the selected word-level row is used M times.

In an example embodiment, the residues are based on a comparison of the number of client data words mapped into a payload area of a server allocated to a selected client, and the number of words in the ODTU frame.

In an example embodiment, the M-byte wide data/stuff words are provided in an ODTUk.ts structure, and wherein the mapping operation comprises a high-order to low-order demultiplexing operation or a low-order to high-order multiplexing operation.

In an example embodiment, the mapping operation comprises a client non-OTN traffic to OTN server payload generic mapping procedure (GMP) operation.

In an example embodiment, in the incremental method, the derivation of said first increment value comprises setting said first increment value to the number of client words mapped into a payload area of a server allocated to said client when the associated flag is Low or to the sum of said number of client words and a topup value when said associated flag is High, where said topup value is the positive difference between said number of client words and the $P_{m,server}$ rounded up to the next higher power of two value.

In an example embodiment, the incremental method, the adding step comprises computing the sum of Residue(j) with said first increment value and applying modulo ($P_{m,server}$ rounded up to the next higher power of two) to said sum to yield Residue(j+1).

In an example embodiment, in the incremental method, setting the state of said associated flag comprises recording whether the sum of said Residue(j) and said first increment value exceeds $P_{m,server}$ rounded up to the next higher power of two value.

In an example embodiment, in the stride method, the method further comprises shifting up a range of usable residue values such that a number of words in an optical channel data tributary unit (ODTU) frame aligns with a modulo wraparound point.

In an example embodiment, in the stride method, the derivation of said second increment value comprises setting said second increment value Residue(W) when the associated flag is Low or to the sum of Residue(W) and a topup value when said associated flag is High, where said topup value is the positive difference between said number of client words and the $P_{m,server}$ rounded up to the next higher power of two value.

In an example embodiment, in the stride method, the adding step comprises computing the sum of Residue(k) with said second increment value and applying modulo ($P_{m,server}$ rounded up to the next higher power of two) to said sum to yield Residue(k+W).

In an example embodiment, in the stride method, setting the state of said associated flag comprises recording whether the sum of said Residue(k) and said second increment value exceeds $P_{m,server}$ rounded up to the next higher power of two value.

In an example embodiment, in the stride method, the method further comprises shifting up a range of usable residue values such that a number of words in an optical channel data tributary unit (ODTU) frame aligns with a modulo wraparound point.

In another embodiment, the present disclosure provides a non-transitory machine readable memory storing statements and instructions for execution by at least one processor to perform a method of method of identifying M-byte wide data/stuff words in a mapping operation in an Optical Transport Network (OTN), as described herein.

In a further embodiment, the present disclosure provides a method of performing a binary decision in a data transmission network comprising: organizing residues of a plurality of decisions in rows of W residues, in order of incrementing index; generating a first row of residues and corresponding flags sequentially in order of index using an incremental method based on a first addition operation and recording the last residue of the first row; generating a subset of residues and corresponding flags in subsequent rows using a stride method based on a second addition operation; generating remaining residues and corresponding flags in subsequent rows using the incremental method based on residues derived from the stride method as starting point; deriving a word-level binary decision from each residue; and expanding each word-level binary decision to cover all bytes within an M byte word.

Other aspects and features of the present disclosure will become apparent to those ordinarily skilled in the art upon review of the following description of specific embodiments in conjunction with the accompanying figures.

Embodiments of the present disclosure may be summarized as using pre-calculation, sum to modulus and M expansion to optimize creation of the justification patterns without the use of multipliers and dividers.

Figure 11:
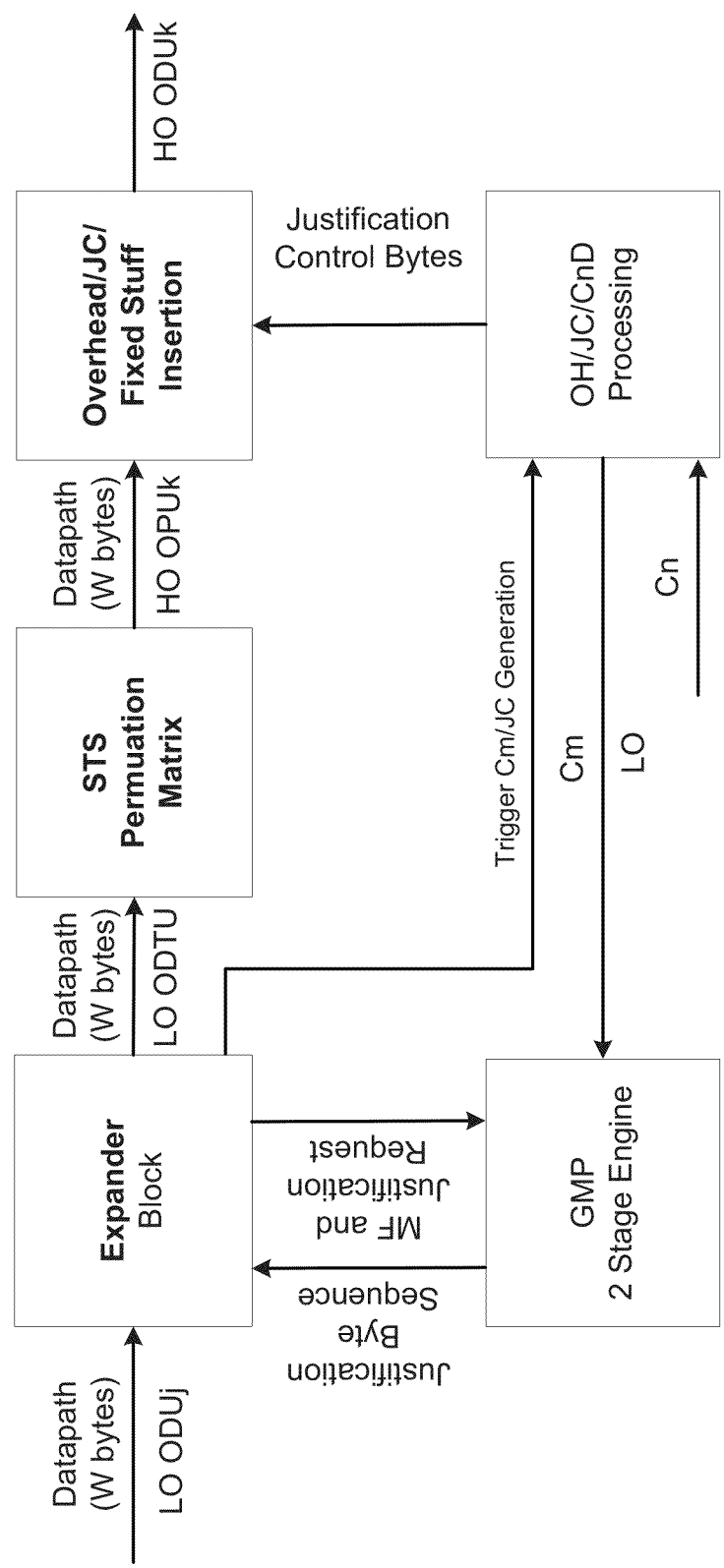
FIG. 11 illustrates an ODTUjk Multiplexer according to an embodiment of the present disclosure.

FIG. 11 shows an example embodiment of an ODTUjk Multiplexer. Details regarding such a multiplexer are provided in co-pending and commonly assigned application entitled "MULTIPLEXING LOW-ORDER TO HIGH-ORDER ODU SIGNALS IN AN OPTICAL TRANSPORT NETWORK", filed of even date herewith, which is incorporated herein by reference in its entirety.

Figure 12:
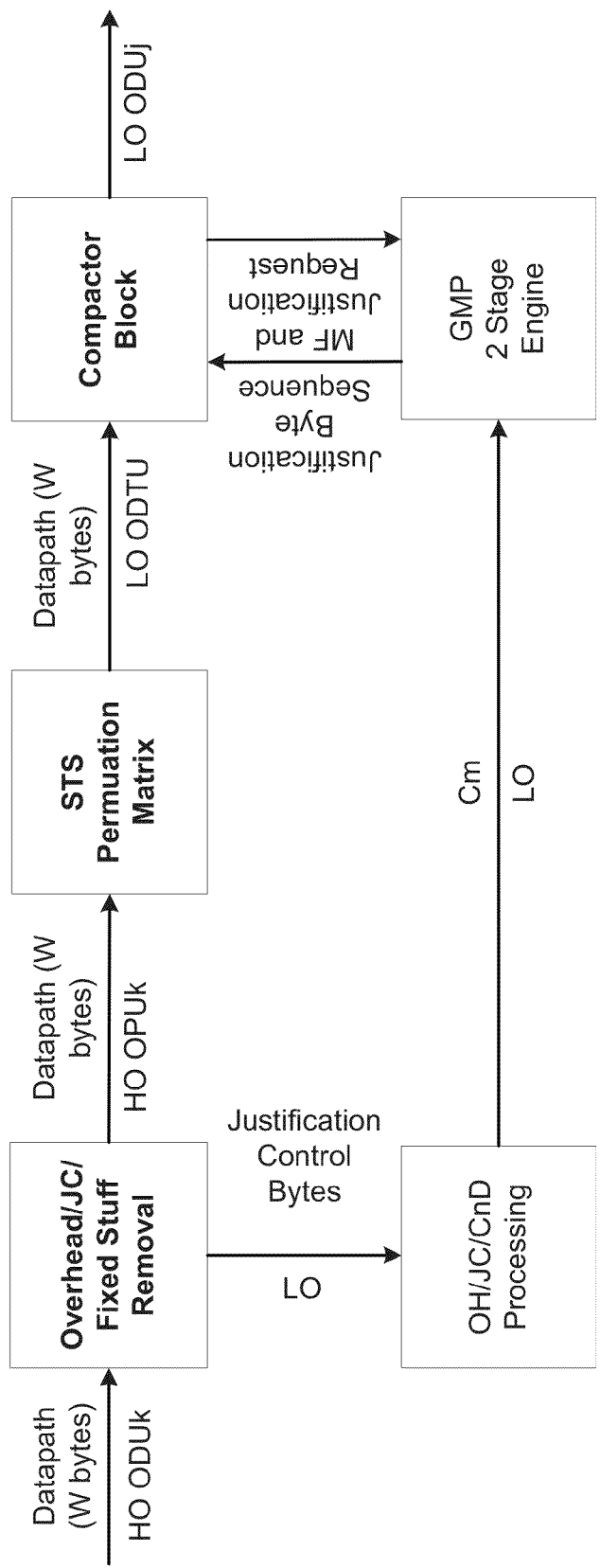
FIG. 12 illustrates an ODTUjk De-Multiplexer according to an embodiment of the present disclosure.

FIG. 12 shows an example embodiment of an ODTUjk De-Multiplexer. Details regarding such a de-multiplexer are provided in co-pending and commonly assigned application entitled "DEMULTIPLEXING HIGH-ORDER TO LOW-ORDER ODU SIGNALS IN AN OPTICAL TRANSPORT NETWORK", filed of even date herewith, which is incorporated herein by reference in its entirety.

In ODTUjk Multiplexing, Low-Order Channel words are justified into a HO server by the insertion of Stuff words. The GMP process adds or removes stuff words, according to Equation 1 and Equation 2, as described earlier, noting that the words comprise M bytes. It is possible to re-write these equations in terms of Residue as defined in Equation 3.

$$\text{Residue } R[j] = (j \times C_m) \bmod P_{m,server} \quad \text{Equation 3}$$

By defining Residue R[j] as shown in Equation 3, the data/stuff equations can be re-written as:

$$\text{client data } (D): \text{ if } R[j] < C_m \quad \text{Equation 4}$$

$$\text{stuff } (S): \text{ if } R[j] \geq C_m. \quad \text{Equation 5}$$

A direct evaluation of the above equations requires multiplication and division operations which are complex to implement. Embodiments of the present disclosure advantageously avoid multiplication and division operations by noting that, it is necessary to compute Residues for all values of 'j' from j=1 to j=$P_{m,server}$, in numerical order, and that $C_m$ is always less than or equal to $P_{m,server}$.

The relationship between R[j+1] and R[j+N] to R[j] can be expressed by Equation 6 and Equation 7 below, and thus, avoid the multiplication operation. By noting that R[j], $C_m$, and R[N] are all less than or equal to $P_{m,server}$, the modulo operation in Equation 6 and Equation 7 can be advantageously reduced to a comparison of the sum against $P_{m,server}$, and subtracting $P_{m,server}$ from it, if the sum exceeds $P_{m,server}$. Thus, the division operation is can be, advantageously, avoided.

$$R[j+1]=\{R[j]+C_m \bmod P_{n,server}\} \bmod P_{m,server} = \{R[j]+C_m\} \bmod P_{m,server} \quad \text{Equation 6}$$

$$R[j+N]=\{R[j]+N \times C_m \bmod P_{m,server}\} \bmod P_{m,server}=\{R[j]+R[N]\} \bmod P_{m,server} \quad \text{Equation 7}$$

The evaluation of Equation 6, and applying the resulting Residue to Equation 4 and Equation 5, can be combined to achieve even greater simplification. Equation 6 requires a magnitude compare against $P_{m,server}$ while Equation 4 requires a magnitude compare against $C_m$. Performing two magnitude compares in series limits the number of sequential j values that can be evaluated in a single clock period. Since, R[j+1] is generated by adding $C_m$ to R[j], R[j+1] will only be smaller than $C_m$ if there had been a wrap-around. Thus, Equation 4 and Equation 5 do not need to be evaluated directly. Detection of the wrap-around at $P_{m,server}$, as part of the evaluation of Equation 6, can be used, advantageously, to determine if Word j is a Data or a Stuff word.

The calculation of residue according to the standard (Equation 3) in a direct implementation would perform the multiplication afresh for each j. Once the comparison is done, the left hand side of Equation 3 is discarded. According to embodiments of the present disclosure, are interested in all j values, and keep track of the left hand side and called it Residue(j), and use it to generate Residue(j+1) without performing the multiply and mod. This approach is also referred to as the sequential, or incremental, method based on a first addition operation. Embodiments of the present disclosure also use R(j) and R(W) to get R(j+W). Stepping ahead by W is also referred to as a stride method, or jump method, based on a second addition operation.

In an example embodiment, the present disclosure provides a method of identifying M-byte wide data/stuff words in a mapping operation in an OTN. According to the method, residues of a plurality of byte-level data/stuff decisions are organized in rows of W residues, in order of incrementing index. A first row of residues is generated sequentially in order of index using an incremental method based on a first addition operation. A subset of residues is generated in subsequent rows using a stride method based on a second addition operation. The remaining residues in subsequent rows are generated based on residues derived from the stride method and using the incremental method. A stuff/data decision is then derived from each residue. Advantageously, each word-level data/stuff decision is expanded to cover all bytes within an M byte word.

Figure 13:
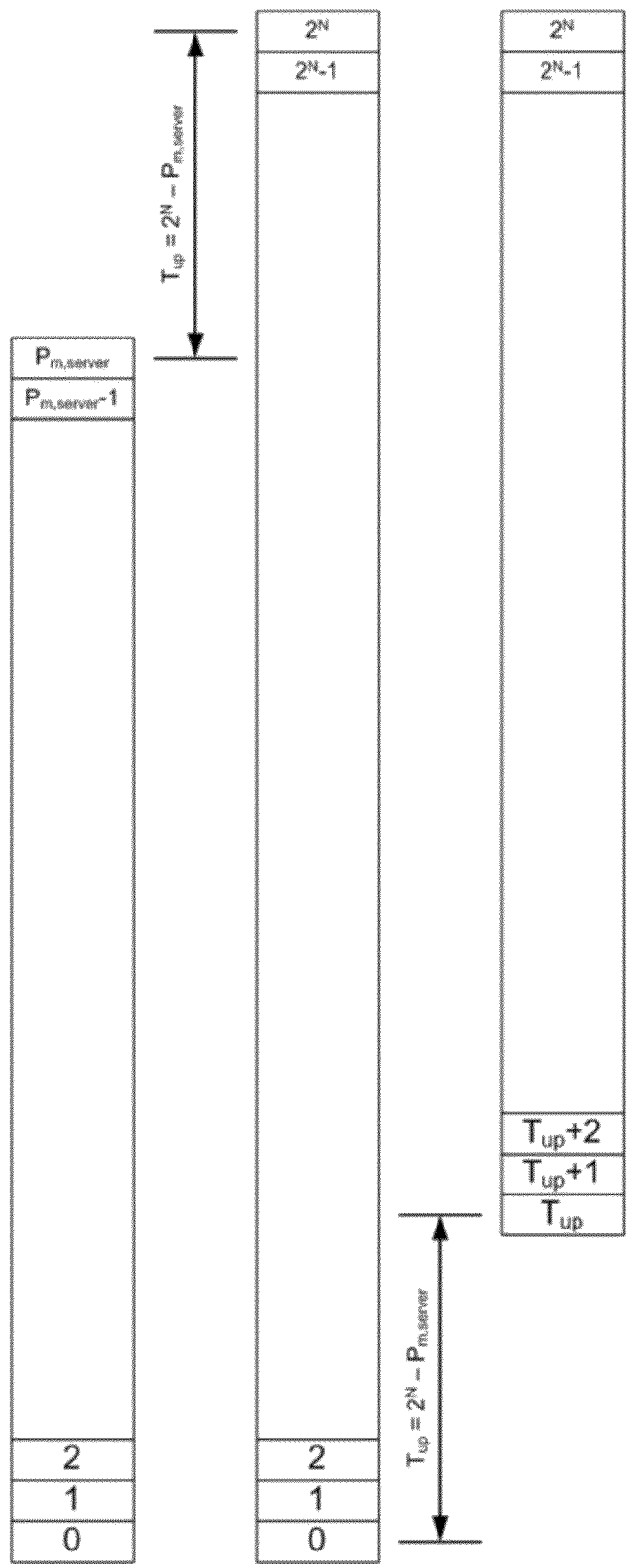
FIG. 13 illustrates natural and topped-up residue ranges according to an embodiment of the present disclosure.

The implementation of Equation 6 can be simplified by shifting the range of usable Residue values up such that $P_{m,server}$ aligns with the next $2^N$ number. The natural range of R[j], and the topped-up Rg[j] is shown in FIG. 13. For this topped up Residue ($R_g[j]$), the minimum value is $T_{up}$ and the modulo wrap-around point is at $2^N$. Comparing the sum against $P_{m,server}$ to determine modulo wrap-around is replaced with checking that the most significant bit (bit with value $2^N$) of the sum is a 1 (wrap-around present) or a 0 (wrap-around absent). If there has been a wrap-around, the new Residue needs to be topped up by $T_{up}$, as given in Equation 8.

$$T_{up}=2^N-P_{m,server} \quad \text{Equation 8}$$

The topping up of R[j+1] does not need to be effected immediately; it can be delayed until R[j+1] is used to generate the next Residue, R[j+2]. A flag (AWAIT_TOPUP) is maintained to keep track of whether the R[j+1] is awaiting top up. When AWAIT_TOPUP is negated, the $R_g[j+1]$ does not require topping up, because it has already been topped-up. When AWAIT_TOPUP is asserted, $R_g[j+1]$ has not been grossed up. $R_g[j+2]$ can be generated by adding $C_m$ or $C_{m\_g}$ depending on the state of AWAIT_TOPUP. $C_m$ and $C_{m\_g}$ are pre-computed. Note that the mod $2^N$ operation is much simpler than mod $P_{m,server}$ as it is mathematically equivalent ignoring the $2^N$ bit of the sum, expressed as a binary number. These simplifications reduce complexity and enable more j values to be evaluated sequentially within each clock period.

$$R_g[j+2]=\{R_g[j+1]+C_m\} \bmod 2^N \text{ when AWAIT\_TOPUP}=0$$

$$R_g[j+2]=\{R[j+1]+C_{m\_g}\} \bmod 2^N \text{ when AWAIT\_TOPUP}=1 \quad \text{Equation 9}$$

Where $C_{m\_g}=\{C_m+T_{up}\} \bmod 2^N$

Figure 14:
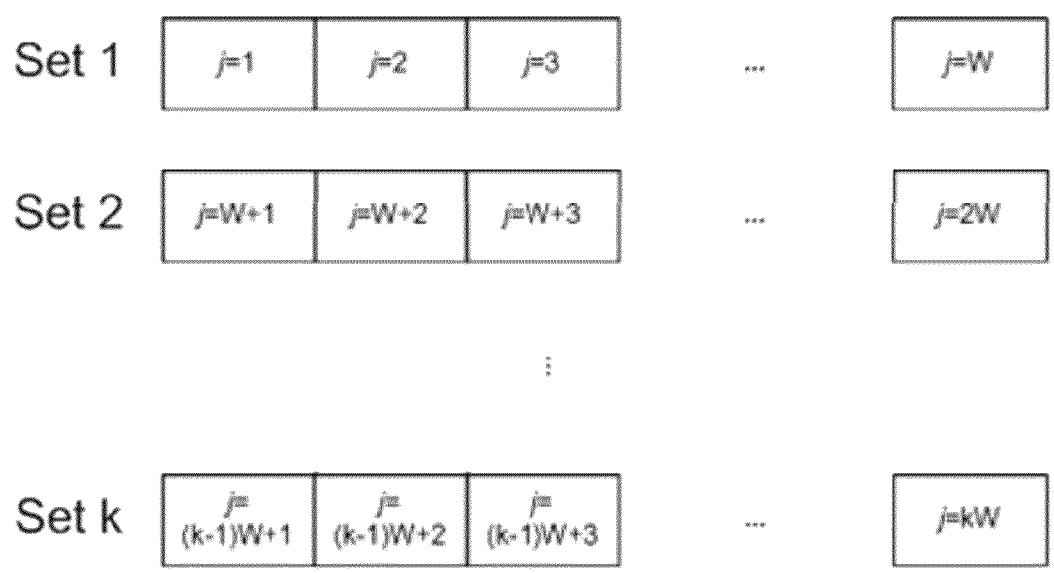
FIG. 14 illustrates sets of W residues and data/stuff decisions according to an embodiment of the present disclosure.

An ODTUjk Multiplexer/De-Multiplexer will typically have a W-byte wide datapath. When M=1, each data bus cycle consumes W Data vs. Stuff decisions. Because the GMP $C_m$ is provided in an ODUk frame, in advance of its first usage to generate decisions, the first set of W Residues and decisions can be generated serially using Equation 6 and Equation 9. (See FIG. 14, Set 1) Thereafter, subsequent sets (i.e., sets 2 . . . k) will have to be generated in parallel within a single clock cycle. Residues in the next set can be generated by summing the corresponding Residue in the current set with the Residue of j=W, R[W], according to Equation 7. Alternatively, only a subset of the W Residues are stored and used to generate the corresponding Residues in the next set. Residues in between those generated using Equation 7 can be generated sequentially using Equation 6 or Equation 9.

Each Data/Stuff decision is applied to all the bytes within each M-byte GMP word. The first GMP word (j=1), is aligned to the W-byte datapath word. For example, the first datapath word of an ODTU01 (See FIG. 5) uses all the decisions in Set 1, one decision for each byte on the datapath. Similarly, the first datapath word of an ODTU2.5 (See FIG. 7) use decisions associated with j=1 to j=roundup(W/5) in Set 1, one decision for every M=5 bytes.

In an example embodiment, each row contains W residues. The first row can be determined based on the incremental method, with very little hardware and consuming very little time. Once the end of the row, the residue of that cell is recorded. The recorded last cell residue can be used to go from any cell in row 1 to the cell directly below in row 2 and obtain its residue. In an embodiment, the residue of the last cell of row 1 is recorded; using the residue of that value, it is possible to jump, or stride, from any cell in row n to the cell directly below in row n+1. This is one way to populate the matrix. Populating row 2 involves using this end-of-row residue to "seed" some cells in row 2, and fill in the blanks. To jump or stride vertically, the value of the initial cell is used to go to the next one below it. According to an embodiment of the present disclosure, it is not necessary to store all residues in row 1 to get to row 2. All that is needed is a subset of residues, and whether those residues resulted from a wrap-around; not all residues need to be kept.

The second stage of the justification pattern generation is the expansion of each Decision by M to create a W-byte mask, where M is equivalent to the number of Tributary Slots allocated to the LO ODUj/ODUflex client. If M=1, then no expansion is necessary, as the word size is equal to one. To generate the expanded justification pattern for M>1, a shift, fixed multiplex expansion and windowed select can be used.

According to an embodiment of the present disclosure, components for M-Expansion comprise: a Mask Shift Register, datapath width (W) bits wide; M Expansion Multiplexers to select fixed configuration in TDM for M expansion; M Expansion registers, M+(W−1) bits wide; Window Multiplexers that select for W bit window from expansion register, updated based on offset each cycle; and a Mask Result Register, W bit mask register.

Figure 15:
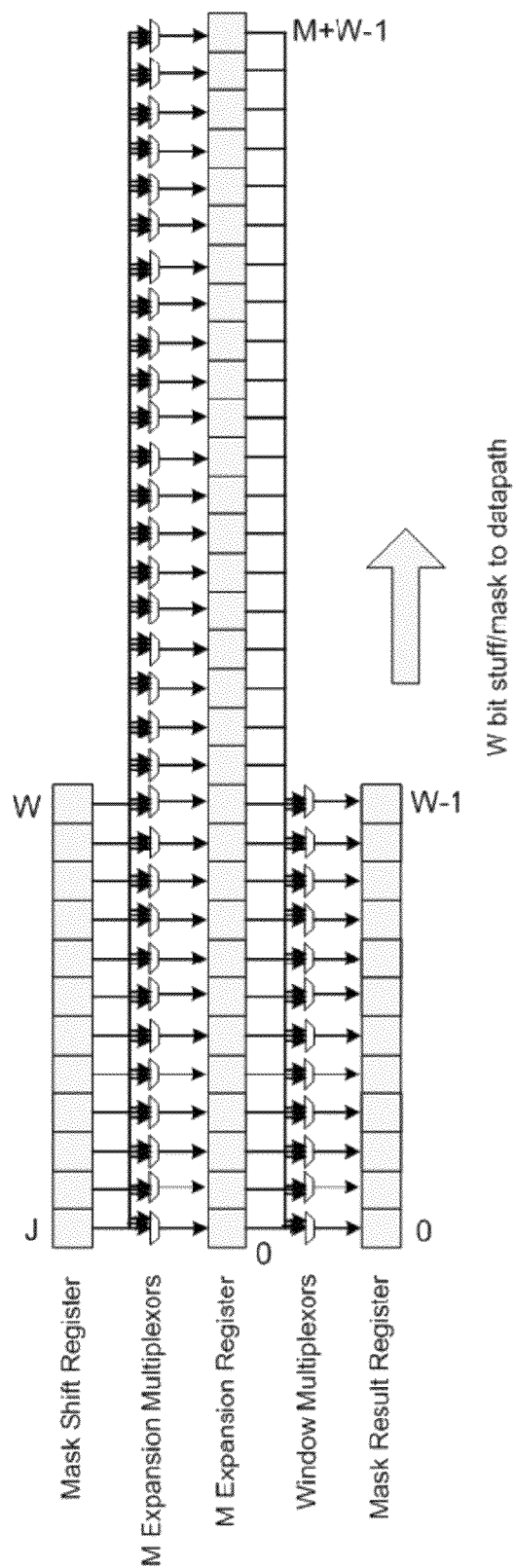
FIG. 15 illustrates M-Expansion components according to an embodiment of the present disclosure.

Referring to FIG. 15 the initial W bit mask (Set 1) is loaded into the W bit Mask Shift Register. The M Expansion Register needs to have minimum of M+(W−1) bits in length to ensure at least one full W bit read can be done with the maximum offset value. For an ODU4, the maximum value of M is 80. The M-Expansion Multiplexers expands each bit in the Mask Shift Register into M bits, from left to right, and the result stored into the M Expansion Register. The sequence of MUX select controls for the M-Expansion Multiplexers is a static function of M and can be pre-computed by software. The Window Multiplexers select W bits from the expanded M bits. The Window Multiplexers start at bit 0 of the M Expansion Register and selects the first W bits initially. The window alternates between the first W bits and the next W bits of the M expansion register.

In the first cycle the Mask Shift Register is loaded and then each cycle it is shifted for M−1 cycles before another W bit mask is loaded. Additionally the Window Multiplexers start at offset 0 and have an additional offset loaded each cycle for the following M−1 cycles. The offset is calculated from Equation 12 and Equation 13. The shift is calculated from Equation 10 and Equation 11 and is dependent on the offset. The values for W divided by M and W Modulus M are pre-computed by firmware in stage 1 and stored in configuration. In the case of ODUflex hitless resize a stand-by configuration is used with new values computed for the new M value.

Shift each cycle;

Shift=$W/M$,offset≤$M$    Equation 10 Mask Register Shift

Shift=$(W/M)$+1,offset>$M$    Equation 11 Mask Register Shift

The M Expansion selects start at 0 and increments every cycle and starts at 0 again after M cycles.

Window offset each cycle;

Offset=$W$ Modulus $M$+previous offset,
    offset≤$M$    Equation 12 Window Multiplexer Offset Offset=($W$ Modulus $M$+previous offset)Modulus
    $M$,offset>$M$    Equation 13 Window Multiplexer Offset Each active cycle needs to produce a new value for shift & offset parameters. The logic is implemented using a set of adders and comparators.

A device according to an embodiment of the present disclosure provides an amount of gate savings over hardware multipliers, with the gate savings: increasing as the number of tributary slots available increases; or being linear of Order (N) proportional to the data rate. Embodiments of the present disclosure will be increasingly valuable for devices operating at 400 Gbps and 1 Tbps. Embodiments of the present disclosure also allow for G.7044 to work in such devices in increasing data rates.

The first of the two main embodiments of the present disclosure is the justification of multiple LO ODUj/ODUflex clients prior to multiplexing into a HO ODUk carrier, as seen in FIG. 11. The second is the justification removal of multiple LO ODUj/ODUflex clients after the de-multiplexing of a HO ODUk carrier, as shown in FIG. 17. LO ODUj clients need to be added or removed without disturbing other LO ODUj/ODUflex clients. In G.7044, the resizing of ODUflex clients must also be performed without corrupting the datastream.

In the example embodiment as shown in FIG. 11, the ODTU MUX performs justification of multiple LO ODUj/ODUflex clients and then multiplexes them together into a HO ODUk carrier. GMP justification marks j=1 for each LO ODTUjk/ODTUk.ts which are the first words that belong to the HO ODUk payload (OPUk). In an embodiment, these must remain aligned for both justification and multiplexing purposes. The end of multi-frame (EOMF) padding bytes that complete the final buffer of the Permutation Matrix for that multi-frame (MF) allow for LO ODUj/ODUflex addition or removal of LO ODUj/ODUflex clients while remaining hitless on other LO ODUj/ODUflex clients. The EOMF padding bytes also allow for G.7044 ODUflex hitless resize with respect to the Permutation Matrix settings. The stand-by configurations for the Permutation Matrix settings and the GMP M expansion allow the change to happen on a multi-frame basis as controlled from the Expander block. The AMP JC bytes and GMP Cm are passed in parallel, beside the STS permutation matrix and therefore arrive ahead of the data going through the buffers in the STS permutation matrix. A mailbox setup allows for simple, aligned synchronization between the data and justification information from the Expander block to the Insertion block without the complexity of a FIFO for the JC bytes or Cm values.

In an example embodiment, the present disclosure provides a method of justifying multiple LO ODUj/ODUflex clients prior to multiplexing into a HO ODUk in an OTN comprising: marking and aligning each LO ODTUjk that is the first word of the HO ODUk payload; and adding a first set of LO ODUj clients while remaining hitless on another set of LO ODUj clients based on end of multi-frame (EOMF) padding bytes, the EOMF padding bytes completing a final buffer of a permutation matrix for a selected multi-frame.

In the example embodiment as shown in FIG. 17, the ODTU DeMUX performs de-multiplexing of the HO ODUk carrier into multiple LO ODTUjk/ODTUk.ts. The LO ODTUjk/ODTUk.ts streams are transformed into LO ODUj/ODUTflex clients by remove of Justification bytes. The j=1 word of each LO ODTUjk/ODTUk.ts in the HO ODUk is identified and remain aligned within each multi-frame (MF) because of the end of multi-frame (EOMF) padding bytes that complete the last buffer of the Permutation Matrix in each multi-frame. This allows for LO addition or removal of LO ODUj/ODUflex clients while remaining hitless on other LO ODUj/ODUflex clients. The EOMF padding also allows for hitless G.7044 ODUflex resizing. The stand-by configurations for the Permutation Matrix configuration settings and the GMP M expansion value at multi-frame boundaries as controlled from the Overhead Removal block. The buffers in the STS permutation matrix also produce latency on the datapath. The JC bytes translated into Cm by the OH/JC/CnD block are passed in parallel and arrive ahead of the data going through the STS permutation matrix. A mailbox setup allows for simple aligned synchronization between the data and justification information between the Removal block and the GMP/Compactor blocks without the complexity of a FIFO for the JC bytes or the Cm values.

Embodiments of the present disclosure pertain to the field of optical data communications. In particular, embodiments of the present disclosure provide a novel approach to the General Mapping Procedure (GMP) used in Multiplexing and Demultiplexing of Low-Order ODUj and ODUflex into a HO ODUk carrier as defined in ITU-T G.709 and is applicable to hitless resizing of Low-Order ODUflex clients as defined in ITU-T G.7044.

Figure 2:
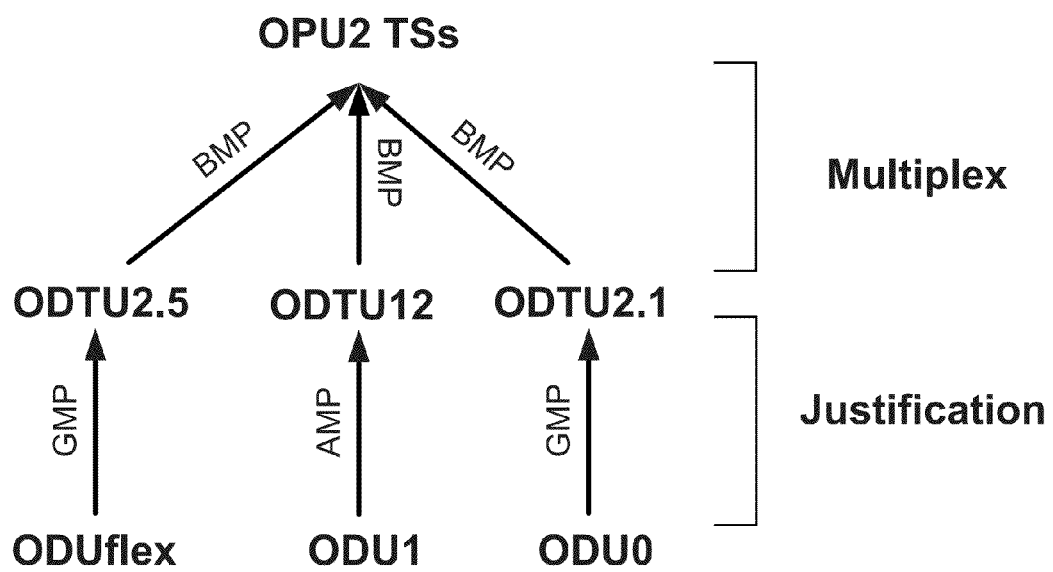
FIG. 2 illustrates an example of multiplexing LO ODUj/ODUflex clients into an ODU2.
Figure 3:
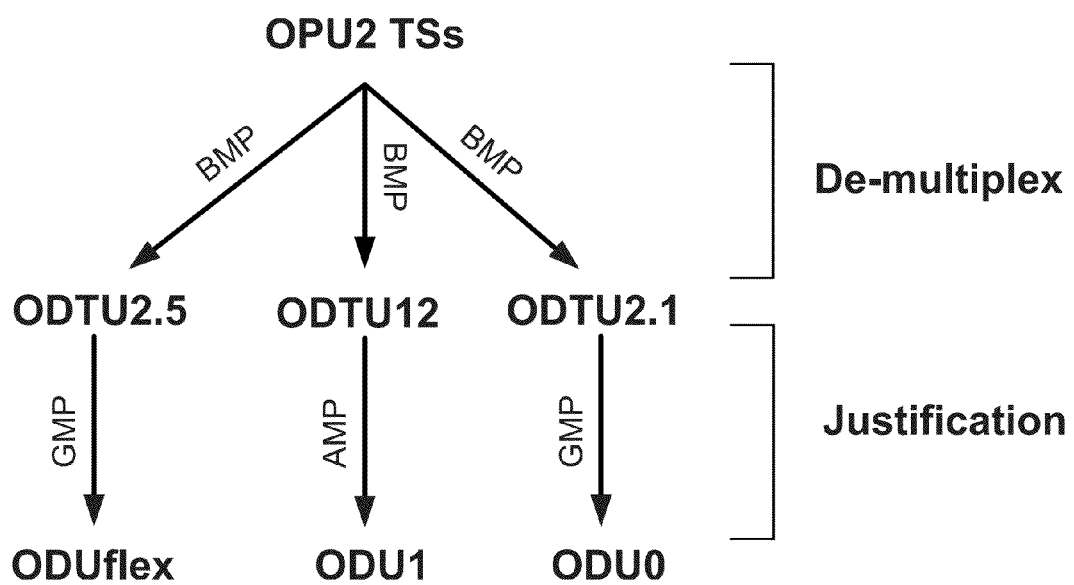
FIG. 3 illustrates an example of de-multiplexing LO ODUj/ODUflex clients from an ODU2.
Figure 8:
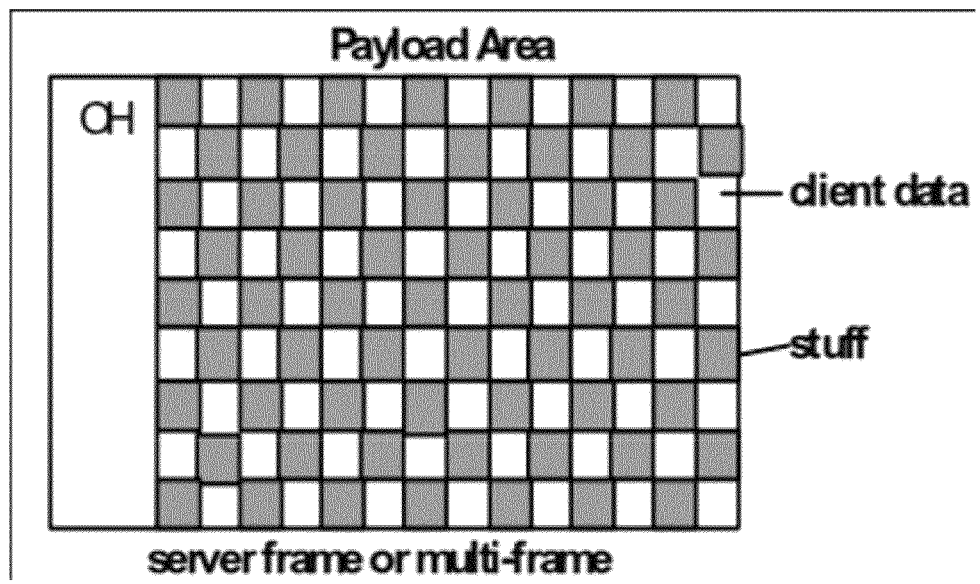
FIG. 8 illustrates a distribution of data and stuff words in an ODTU frame.
Figure 9A:
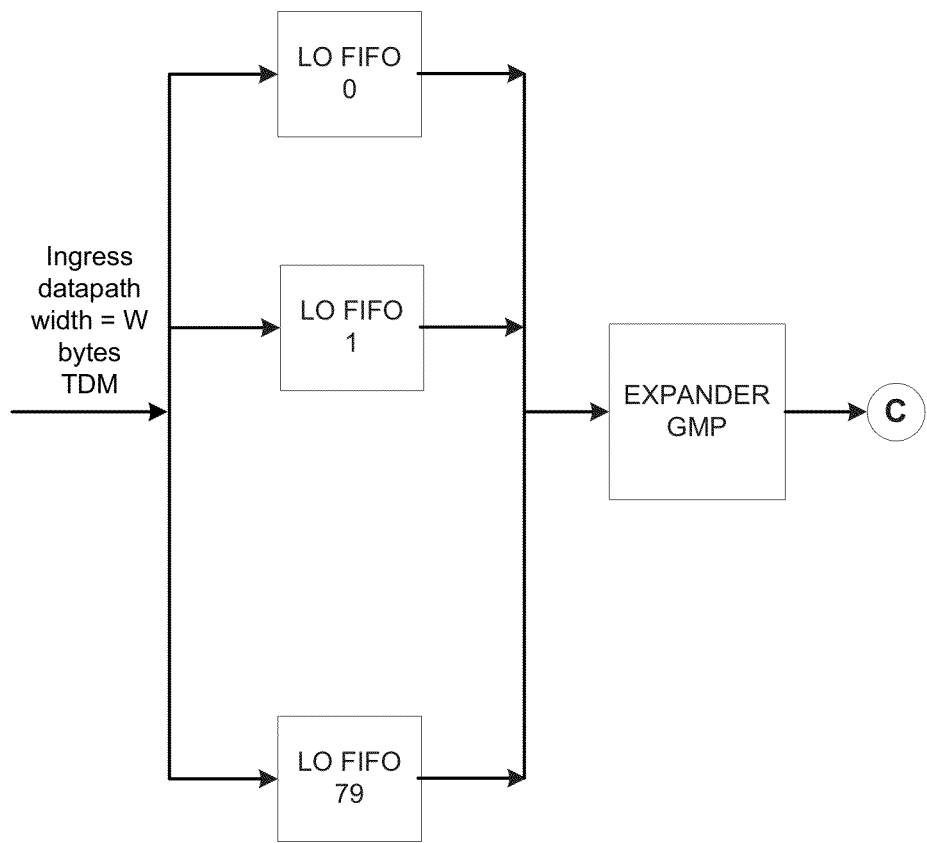
FIGS. 9A and 9B illustrate a known implementation of an ODTUjk multiplexer.
Figure 9B:
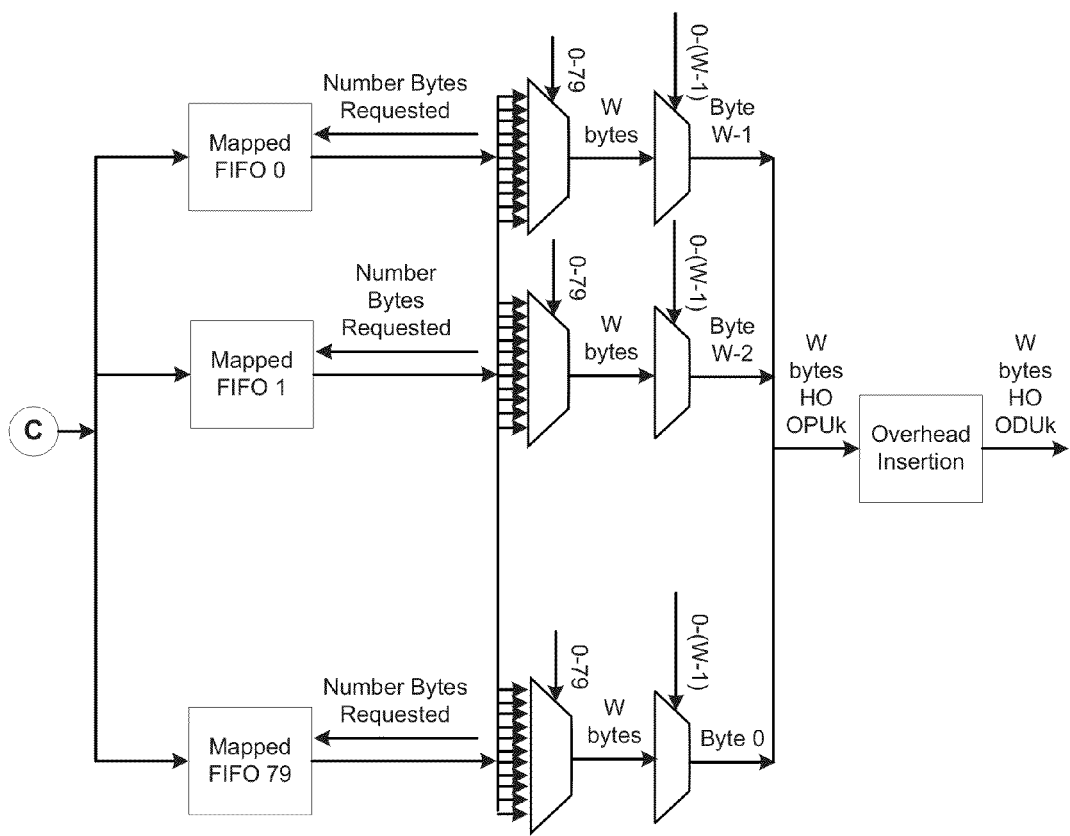
Figure 10:
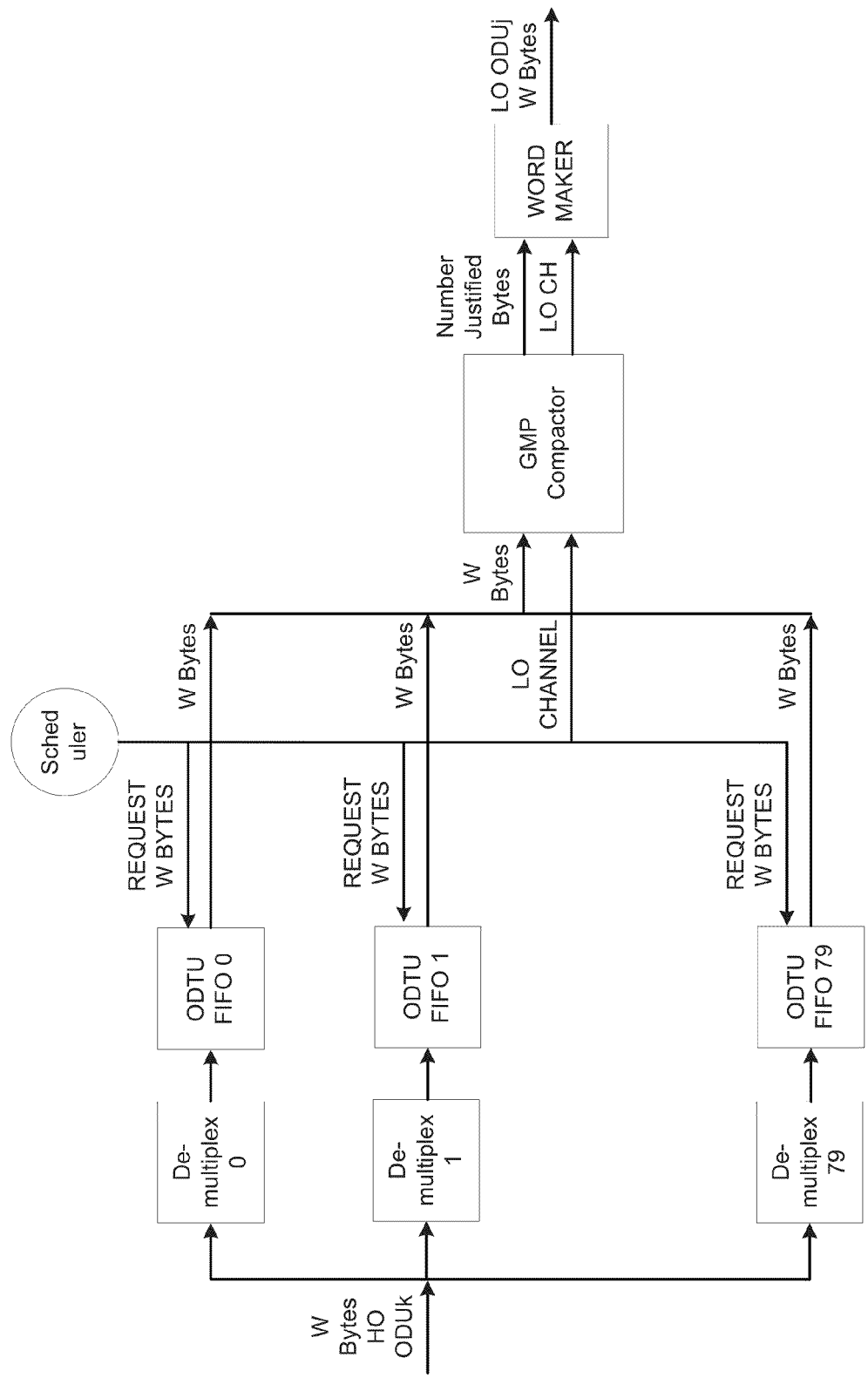
FIG. 10 illustrates a known implementation of an ODTUjk de-multiplexer.

Other embodiments of the present disclosure are used for Generic Mapping Procedure (GMP) to map and demap Constant Bit Rate clients into ODUk carriers. Such embodiments can be referred to as non-multiplexing embodiments which only use the justification step (mapping or demapping) of FIG. 2 or FIG. 3. In such embodiments, the LO channel of FIG. 2 or 3 is instead a client non-OTN traffic, and the HO is the server OTN channel, and no multiplexing is performed. GMP is used to map the client into the server payload. The new server OTN channel may itself be the LO channel of a multiplexing operation in the system. For example, a 40 Gigabit Ethernet client can be mapped into OTU3, then that same ODU3 is one of the low orders going into an ODU4. In an embodiment, the GMP is the same engine and is a reusable piece of IP in both instances, such as performing end of frame padding. In an example embodiment, a non-OTN signal uses the entire payload (all trib slots) for an OTN frame.

Other embodiments of the present disclosure are used in environments other than OTN. For example, rather than a specific implementation that involves mapping and MUX, and data/stuff, the present disclosure provides a method of performing a binary decision in a data transmission network. For example, such a method makes a True/False decision that is based on Equation 1 and 2. In an example embodiment, a method of performing a binary decision in a data transmission network comprises: organizing residues of a plurality of decisions in rows of W residues, in order of incrementing index; generating a first row of residues and corresponding flags sequentially in order of index using an incremental method based on a first addition operation and recording the last residue of the first row; generating a subset of residues and corresponding flags in subsequent rows using a stride method based on a second addition operation; generating remaining residues and corresponding flags in subsequent rows using the incremental method based on residues derived from the stride method as starting point; deriving a word-level binary decision from each residue; and expanding each word-level binary decision to cover all bytes within an M byte word.

Embodiments of the present disclosure provide one or more of the following features: top-up each sequential Cm to avoid using multiplication; generate first datapath width W cells in GMP pattern sequentially prior to use; each cell N (0 to W−1), within next W width GMP pattern can be generated from the previous W pattern cell N (0 to W−1); the next cell can be computed with combinational logic from the previous cell.

Embodiments of the present disclosure also provide one or more of the following features: expanding an existing datapath width W GMP pattern for M byte stuff or data with fixed multiplexers and pre-computed selects; window select for the datapath width W byte/stuff is selected through simple shift and multiplexed from the M expanded GMP pattern; a method to calculate next Cm using top-up, with residues ahead of justification pattern use; a method to calculate generate initial portion of justification pattern prior to use; a method to calculate each cell within portion from previous cell; a method to calculate justification pattern every cycle after initial portion; a method to calculate expanded justification pattern based on M; a method to calculate portion of justification pattern needed from expanded pattern.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A computer-implemented method of identifying M-byte wide data/stuff bytes in a mapping operation or multiplexing operation in an Optical Transport Network (OTN) comprising:
   organizing residues of a plurality of data/stuff decisions in rows of W residues, in order of incrementing index;
   generating a first row of residues and corresponding flags sequentially in order of index using an incremental method based on a first addition operation and recording the last residue of the first row;
   generating a subset of residues and corresponding flags in subsequent rows using a stride method based on a second addition operation;
   generating remaining residues and corresponding flags in subsequent rows using the incremental method based on residues derived from the stride method as starting point;
   deriving a word-level stuff/data decision from each residue; and
   expanding each word-level data/stuff decision to cover all bytes within an M byte word.

2. The method of claim 1 wherein the first addition operation of the incremental method comprises adding to Residue (j) a first increment value derived from the number of client words mapped into a payload area of a server allocated to a client and a flag associated with Residue(j), to generate Residue(j+1) and its associated flag, in the absence of a multiply or mod operation involving a non-power of two divisor.

3. The method of claim 1 wherein the rows each comprise a plurality of cells, and wherein the second addition operation in the stride method comprises adding to the Residue(k) of a cell in row N, a second incremental value derived from the Residue(W) of the last cell in Row 1 and a flag associated with Residue(k), to generate Residue(k+W) and its associated flag, in the absence of a multiply or mod operation involving a non-power of two divisor.

4. The method of claim 1 wherein expanding each word-level decision comprises:
   selecting each word-level data/stuff decision to generate M data/stuff decisions and create a set of byte-level data/stuff decisions;

selecting a first W length row as the byte-level stuff/data decisions;

shifting an original row of word-level data/stuff decisions and offsetting a window for choosing a W length byte-level data/stuff in order to select a next W length byte-level data/stuff from the rows; and using a next word-level row after the selected word-level row is used M times.

5. The method of claim 1 wherein the residues are based on a comparison of the number of client data words mapped into a payload area of a server allocated to a selected client, and the number of words in the ODTU frame.

6. The method of claim 1 wherein the M-byte wide data/stuff words are provided in an ODTUk.ts structure, and wherein the mapping operation comprises a high-order to low-order demultiplexing operation or a low-order to high-order multiplexing operation.

7. The method of claim 1 wherein the mapping operation comprises a client non-OTN traffic to OTN server payload generic mapping procedure (GMP) operation.

8. The method of claim 2 wherein the derivation of said first increment value comprises setting said first increment value to the number of client words mapped into a payload area of a server allocated to said client when the associated flag is Low or to the sum of said number of client words and a topup value when said associated flag is High, where said topup value is the positive difference between said number of client words and the $P_{m,server}$ rounded up to the next higher power of two value.

9. The method of claim 2 wherein the adding step comprises computing the sum of Residue(j) with said first increment value and applying modulo ($P_{m,server}$ rounded up to the next higher power of two) to said sum to yield Residue(j+1).

10. The method of claim 2 wherein setting the state of said associated flag comprises recording whether the sum of said Residue(j) and said first increment value exceeds $P_{m,server}$ rounded up to the next higher power of two value.

11. The method of claim 2 further comprising shifting up a range of usable residue values such that a number of words in an optical channel data tributary unit (ODTU) frame aligns with a modulo wrap-around point.

12. The method of claim 3 wherein the derivation of said second increment value comprises setting said second increment value Residue(W) when the associated flag is Low or to the sum of Residue(W) and a top-up value when said associated flag is High, where said top-up value is the positive difference between said number of client words and the $P_{m,server}$ rounded up to the next higher power of two value.

13. The method of claim 3 wherein the adding step comprises computing the sum of Residue(k) with said second increment value and applying modulo ($P_{m,server}$ rounded up to the next higher power of two) to said sum to yield Residue (k+W).

14. The method of claim 3 wherein setting the state of said associated flag comprises recording whether the sum of said Residue(k) and said second increment value exceeds $P_{m,server}$ rounded up to the next higher power of two value.

15. The method of claim 3 further comprising shifting up a range of usable residue values such that a number of words in an optical channel data tributary unit (ODTU) frame aligns with a modulo wrap-around point.

16. A non-transitory machine readable memory storing statements and instructions for execution by at least one processor to perform a method of method of identifying M-byte wide data/stuff words in a mapping operation in an Optical Transport Network (OTN), the method comprising:

organizing residues of a plurality of data/stuff decisions in rows of W residues, in order of incrementing index;

generating a first row of residues and corresponding flags sequentially in order of index using an incremental method based on a first addition operation and recording the last residue of the first row;

generating a subset of residues and corresponding flags in subsequent rows using a stride method based on a second addition operation;

generating remaining residues and corresponding flags in subsequent rows using the incremental method based on residues derived from the stride method as starting point;

deriving a word-level stuff/data decision from each residue; and expanding each word-level data/stuff decision to cover all bytes within an M byte word.

17. The non-transitory machine readable memory of claim 16 wherein the first addition operation of the incremental method comprises adding to Residue(j) a first increment value derived from the number of client words mapped into a payload area of a server allocated to a client and a flag associated with Residue(j), to generate Residue(j+1) and its associated flag, in the absence of a multiply or mod operation involving a non-power of two divisor.

18. The non-transitory machine readable memory of claim 16 wherein the rows each comprise a plurality of cells, and wherein the second addition operation in the stride method comprises adding to the Residue(k) of a cell in row N, a second incremental value derived from the Residue(W) of the last cell in Row 1 and a flag associated with Residue(k), to generate Residue(k+W) and its associated flag, in the absence of a multiply or mod operation involving a non-power of two divisor.

19. The non-transitory machine readable memory of claim 16 wherein expanding each word-level decision comprises:

selecting each word-level data/stuff decision to generate M data/stuff decisions and create a set of byte-level data/stuff decisions;

selecting a first W length row as the byte-level stuff/data decisions;

shifting an original row of word-level data/stuff decisions and offsetting a window for choosing a W length byte-level data/stuff in order to select a next W length byte-level data/stuff from the rows; and using a next word-level row after the selected word-level row is used M times.

20. The non-transitory machine readable memory of claim 16 wherein the residues are based on a comparison of the number of client data words mapped into a payload area of a server allocated to a selected client, and the number of words in the ODTU frame.

21. The non-transitory machine readable memory of claim 16 wherein the M-byte wide data/stuff words are provided in an ODTUk.ts structure, and wherein the mapping operation comprises a high-order to low-order multiplexing/demultiplexing operation.

22. The non-transitory machine readable memory of claim 16 wherein the mapping operation comprises a client non-OTN traffic to OTN server payload generic mapping procedure (GMP) operation.

23. The non-transitory machine readable memory of claim 17 wherein the derivation of said first increment value comprises setting said first increment value to the number of client words mapped into a payload area of a server allocated to said client when the associated flag is Low or to the sum of said number of client words and a topup value when said associated flag is High, where said topup value is the positive difference between said number of client words and the $P_{m,server}$ rounded up to the next higher power of two value.

24. The non-transitory machine readable memory of claim 17 wherein the adding step comprises computing the sum of Residue(j) with said first increment value and applying modulo ($P_{m,server}$ rounded up to the next higher power of two) to said sum to yield Residue(j+1).

25. The non-transitory machine readable memory of claim 17 wherein setting the state of said associated flag comprises recording whether the sum of said Residue(j) and said first increment value exceeds $P_{m,server}$ rounded up to the next higher power of two value.

26. The non-transitory machine readable memory of claim 17 wherein the method further comprises shifting up a range of usable residue values such that a number of words in an optical channel data tributary unit (ODTU) frame aligns with a modulo wrap-around point.

27. The non-transitory machine readable memory of claim 18 wherein the derivation of said second increment value comprises setting said second increment value Residue(W) when the associated flag is Low or to the sum of Residue(W) and a topup value when said associated flag is High, where said topup value is the positive difference between said number of client words and the $P_{m,server}$ rounded up to the next higher power of two value.

28. The non-transitory machine readable memory of claim 18 wherein the adding step comprises computing the sum of Residue(k) with said second increment value and applying modulo ($P_{m,server}$ rounded up to the next higher power of two) to said sum to yield Residue(k+W).

29. The non-transitory machine readable memory of claim 18 wherein setting the state of said associated flag comprises recording whether the sum of said Residue(k) and said second increment value exceeds $P_{m,server}$ rounded up to the next higher power of two value.

30. The non-transitory machine readable memory of claim 18 further comprising shifting up a range of usable residue values such that a number of words in an optical channel data tributary unit (ODTU) frame aligns with a modulo wrap-around point.

31. A computer-implemented method of performing a binary decision in a data transmission network comprising:
    organizing residues of a plurality of decisions in rows of W residues, in order of incrementing index;
    generating a first row of residues and corresponding flags sequentially in order of index using an incremental method based on a first addition operation and recording the last residue of the first row;
    generating a subset of residues and corresponding flags in subsequent rows using a stride method based on a second addition operation;
    generating remaining residues and corresponding flags in subsequent rows using the incremental method based on residues derived from the stride method as starting point;
    deriving a word-level binary decision from each residue; and
    expanding each word-level binary decision to cover all bytes within an M byte word.

* * * * *